(12) United States Patent
Szepessy

(10) Patent No.: US 11,993,326 B2
(45) Date of Patent: May 28, 2024

(54) ADJUSTMENT OF THE STEERING FEEL SUBJECT TO THE STEERING SPEED

(71) Applicants: thyssenkrupp Presta AG, Eschen (LI); thyssenkrupp AG, Essen (DE)

(72) Inventor: Imre Szepessy, Mauren (LI)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 622 days.

(21) Appl. No.: 17/269,034

(22) PCT Filed: Sep. 13, 2019

(86) PCT No.: PCT/EP2019/074519
§ 371 (c)(1),
(2) Date: Feb. 17, 2021

(87) PCT Pub. No.: WO2020/058126
PCT Pub. Date: Mar. 26, 2020

(65) Prior Publication Data
US 2021/0261191 A1    Aug. 26, 2021

(30) Foreign Application Priority Data
Sep. 21, 2018  (DE) .................. 10 2018 123 291.8

(51) Int. Cl.
*B62D 6/00*     (2006.01)
*B62D 5/04*     (2006.01)

(52) U.S. Cl.
CPC ........... *B62D 6/008* (2013.01); *B62D 5/0463* (2013.01)

(58) Field of Classification Search
CPC .............................. B62D 6/008; B62D 5/0463
See application file for complete search history.

(56) References Cited

U.S. PATENT DOCUMENTS

2003/0121713 A1   7/2003  Stout
2004/0226770 A1   11/2004 Nishiyama
2015/0375780 A1   12/2015 Chai
(Continued)

FOREIGN PATENT DOCUMENTS

CN    101860305 A    10/2010
CN    108290601 A    7/2018
(Continued)

OTHER PUBLICATIONS

Machine Translation of DE-102016221500-A1 (Year: 2017).*
English Translation of International Search Report issued in PCT/EP2019/074519, dated Dec. 18, 2019.

*Primary Examiner* — Alan D Hutchinson
(74) *Attorney, Agent, or Firm* — thyssenkrupp North America, LLC

(57) ABSTRACT

A method for operating a motor vehicle steering system may involve generating a steering feel, with a steering force assistance or a countertorque that is introduced by a feedback actuator into a steering handle, in a manner that is dependent on a driver-side manual torque applied to the steering handle. The steering feel may be represented by way of a characteristic curve that is adapted in a manner that is dependent on steering speed in the case of steering speeds above 100°/s such that an adapted characteristic curve has a smaller maximum change of the gradient than the characteristic curve in the case of lower steering speeds.

14 Claims, 1 Drawing Sheet

(56) References Cited

U.S. PATENT DOCUMENTS

2018/0319422 A1    11/2018  Polmans et al.
2019/0118853 A1     4/2019  Delmarco et al.
2019/0176878 A1*    6/2019  Lee .................... H02P 29/40

FOREIGN PATENT DOCUMENTS

| CN | 108290602 A      | 7/2018 | |
|----|------------------|--------|--|
| DE | 103 25 587 A     | 1/2004 | |
| DE | 102016221500 A1 * | 5/2017 | ......... B62D 15/0225 |
| EP | 2 960 139 B      | 2/2017 | |
| JP | 2006218888 A     | 8/2006 | |

* cited by examiner

ADJUSTMENT OF THE STEERING FEEL SUBJECT TO THE STEERING SPEED

CROSS REFERENCE TO RELATED APPLICATIONS

This application is a U.S. National Stage Entry of International Patent Application Serial Number PCT/EP2019/074519, filed Sep. 13, 2019, which claims priority to German Patent Application No. DE 10 2018 123 291.8, filed Sep. 21, 2018, the entire contents of both of which are incorporated herein by reference.

FIELD

The present disclosure generally relates to steering systems for motor vehicles and to methods for operating steering systems.

BACKGROUND

In EPS (Electric Power Steering) systems or steer-by-wire steering systems, it is known for steering properties and the steering feel to be influenced, in order for the driving comfort for the driver to be increased. Here, a manual torque, which is applied at a steering means, for example a steering wheel, is determined, in order to assist the force which is applied by the driver or to counteract the force which is applied by the driver. In this way, the driver can be given a driving feel which corresponds to the current driving situation.

In the case of a steer-by-wire steering system, the steering feel is generated by means of a feedback actuator. In the case of an EPS system, in the case of which there is a mechanical connection between the steering wheel and the wheels to be steered, regulating concepts are known which make it possible for a steering torque, which corresponds to the manual torque to be adjusted in order to generate a desired steering feel at the steering wheel. To this end, an electric motor or an electromechanical servo unit are actuated or adjusted in such a way that a steering torque, which corresponds to the desired manual torque, is set.

In certain driving states and/or in some driving situations, it can occur that a satisfactory steering feel is not provided. Thus, in particular in the case of high steering speeds, the change of the assistance or of the countertorque, which prevails at the steering wheel, is discernible by the driver. This pronounced change leads to uncertainty of the driver, and is therefore undesired.

Thus, a need exists for a steering system for motor vehicles, which steering system provides an improved and more consistent steering feel in the case of high steering speeds.

DETAILED DESCRIPTION

Figure 1:
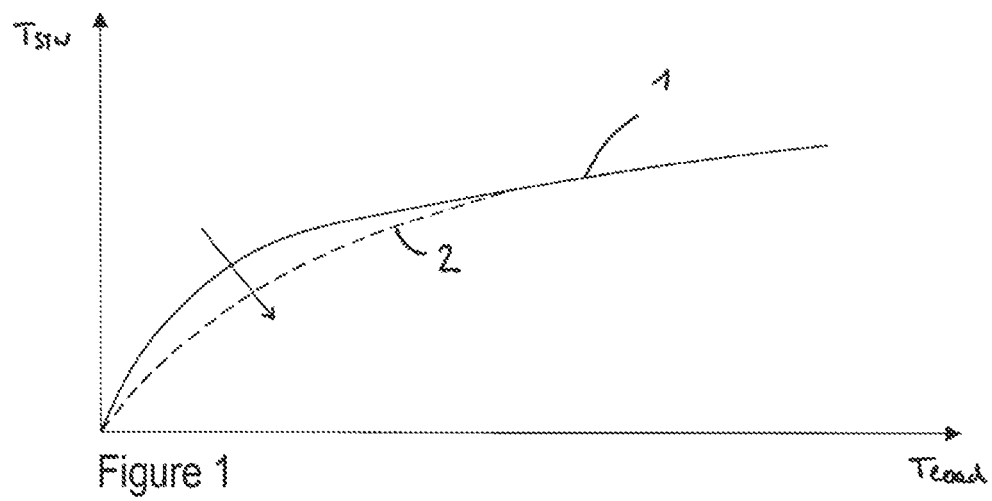
FIG. 1 is a diagrammatic view of a steering column torque control curve of an electromechanical motor vehicle steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Accordingly, a method for operating a steering system of a motor vehicle is provided, in the case of which method a steering force assistance or a countertorque, which is introduced by a feedback actuator into a steering handle, generates a steering feel in a manner which is dependent on a driver-side manual torque which is applied to the steering handle, the steering feel being represented by means of a characteristic curve which is adapted in a manner which is dependent on the steering speed in the case of steering speeds above 150°/s, in particular above 200°/s, and particularly preferably in a range from 200°/s to 300°/s, in such a way that the adapted characteristic curve has a smaller maximum change of the gradient than the characteristic curve in the case of lower steering speeds.

An unexpected increase in a discernible torque at the steering wheel can thus be prevented in the case of high steering speeds. The steering feel is improved considerably as a result.

In one preferred embodiment, the adaptation of the characteristic curve comprises rescaling of the X-axis, in particular in the region of the zero crossing of the characteristic curve.

The characteristic curves are preferably base functions.

In one exemplary embodiment, the steering system is an electromechanical steering system, and the characteristic curve is a base torque curve or a steering column torque control curve.

It can also be provided that the steering system is a steer-by-wire steering system, and the characteristic curve reproduces the dependence of the steering torque which is provided by the feedback actuator on the steering angle.

The adaptation of the characteristic curve can comprise an addition of a constant which can be dependent, in particular, on the steering speed.

Furthermore, a steer-by-wire steering system for motor vehicles is provided, with a steering actuator which acts on the steered wheels, is regulated electronically in a manner which is dependent on a driver's steering request, and acts on the steered wheels by means of a rack and pinion steering gear, with a feedback actuator which transmits feedback effects of the road to a steering wheel, the feedback actuator providing a steering torque in a manner which is dependent on a steering angle by means of at least two characteristic curves, and a first characteristic curve being provided for high steering speeds and a second characteristic curve being provided for lower steering speeds, the first characteristic curve having a smaller maximum change of the gradient than the second characteristic curve. As has already been described above, this results in a considerably improved steering feel. The first characteristic curve is preferably calculated by means of the second characteristic curve.

The adaptation of the characteristic curve comprises an addition of a constant which can be dependent, in particular, on the steering speed.

Furthermore, an electromechanical steering system for a motor vehicle is provided, having a steering pinion which is connected to a lower steering shaft and is in engagement with a rack which is mounted in a housing such that it can be displaced along a longitudinal axis, for the steering of wheels, and at least one electric motor for steering force assistance, the steering force assistance being defined by means of at least two characteristic curves which are base torque curves or steering column torque control curves, and a first characteristic curve being provided for high steering speeds and a second characteristic curve being provided for lower steering speeds, the first characteristic curve having a smaller maximum change of the gradient than the second characteristic curve. As has already been described above, this results in a considerably improved steering feel.

The first characteristic curve is preferably calculated by means of the second characteristic curve by way of scaling of the X-axis, it being preferred if, in the case of the use of a base torque curve, the X-axis is stretched and, in the case of the use of a steering column torque control curve, the X-axis is compressed.

Figure 2:
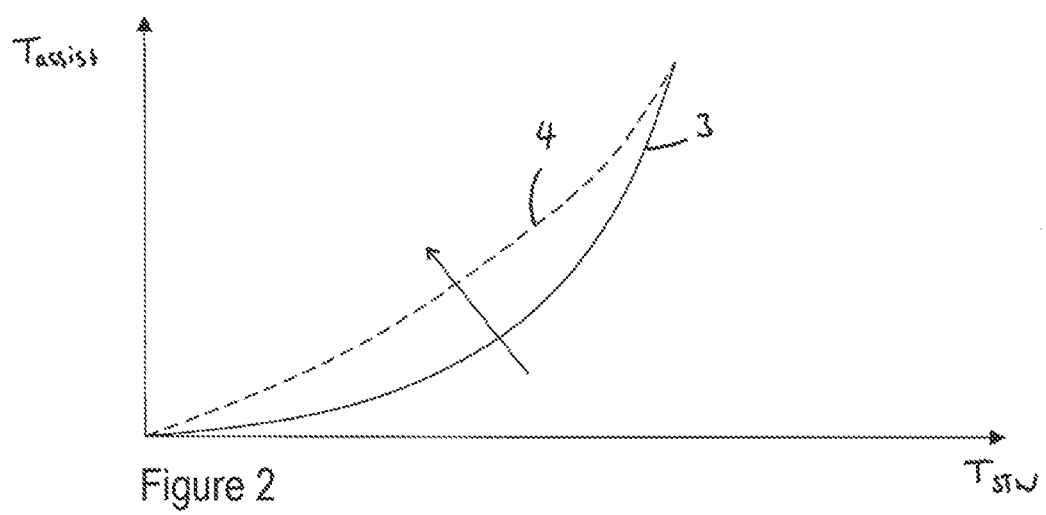
FIG. 2 is a diagrammatic view of a base torque curve of an electromechanical motor vehicle steering system.

FIGS. 1 and 2 show two different control types of a steering feel of an electromechanical motor vehicle steering system. These are base functions, which ensure an appropriate steering assistance of a classic power steering system, as is also known from hydraulic steering systems. Additional functional components, which are not shown in the figures, ensure that feedback effects of the roadway are available to the driver as discernible information despite the friction in the bearings or the inertia of the movable components of a steering system. These include, inter alia, an active return control means of the steering wheel into the central position, and a directional stability correction means, in order to facilitate the required counter-steering of the driver, for example, in the case of an obliquely inclined roadway. Further functional components are also conceivable.

FIG. 1 shows a dependence of a steering torque $T_{STW}$ on an estimated rack force $T_{load}$. The torque $T_{STW}$ is the torque which is to be applied at the steering wheel and is required in order to achieve the rack force $T_{load}$. This profile serves as a basis for a steering column torque control algorithm which regulates the assistance torque of an electric motor in an electromechanical motor vehicle steering system.

As has already been described above, the base function can have additional functional components such as a dependence on the vehicle speed. For low vehicle speeds, low steering torques over the entire range of the rack force are desirable. This leads to the steering system being smooth-running during parking, for example. In the case of higher vehicle speeds, in contrast, a greater steering torque is provided, in order to apply the desired rack force. The steering assistance is lower. The steering movements are therefore stiffer and more direct.

According to the invention, the steering feel is optimized by virtue of the fact that a different steering feel is provided in a manner which is dependent on a steering speed $\dot{\varphi}_{STW}$. FIG. 1 shows a conventional profile 1 (continuous line) and an adapted steering feel 2 for high steering speeds (dashed line). The steering speed $\dot{\varphi}_{STW}$ is the temporal change of the steering angle. High steering speeds are steering speeds in a range of 200°/s-300°/s. The conventional profile reproduces the steering feel in the case of low steering speeds in a range of 0-50°/s. The arrow indicates the change of the steering feel toward high steering speeds.

The conventional profile 1 is root function-like; after a steep rise in a range of 1-5 Nm of the steering torque $T_{STW}$ in the case of small rack forces, the curve flattens greatly and is virtually linear. The rise is dependent on the steering feel profile which is different depending on the vehicle. The steering assistance is low in the case of small rack forces and is great in the case of great rack forces.

In the case of high steering speeds 2, the rise is considerably flatter in the region of small rack forces, and merges into the curve for lower steering speeds in the case of higher rack forces. In other words, the gradient is considerably smaller in the case of small rack forces, and the profile of the curve has a virtually constant gradient over a relatively large range. In the case of high steering speeds, it is therefore avoided that the driver notices the great rise in the steering torque to be applied in the case of small rack forces and is irritated as a result. The gradient of the characteristic curve therefore does not exceed a predefined limit value, as a result of which the characteristic curve 2 is considerably flatter than the characteristic curve for lower steering speeds 1.

Instead of the rack force, the base steering torque can also be dependent on another variable which represents the cornering forces of the tires. Here, for example, the transverse acceleration is a suitable variable instead of the rack force. The base steering torque can additionally also be calculated from other variables, such as the steering angle, the steering wheel angle or the yaw rate.

FIG. 2 shows a base torque curve 3 ("boost curve") which indicates a base assistance torque $T_{assist}$ as a function of a steering torque $T_{STW}$ which prevails at the steering wheel. The characteristic curve 3 is a base which can likewise be extended by further functional components. An algorithm calculates a torque $T_{assist}$ by means of the base torque curve 3 on the basis of the steering torque $T_{STW}$ which is applied by the driver, which torque $T_{assist}$ is applied in order to assist the steering movement. A conventional profile of the base torque curve 3 (continuous line) and an adapted steering feel for high steering speeds 4 (dashed line) are shown. The arrow indicates the change of the steering feel toward high steering speeds. In the case of the conventional base torque curve 3, the assistance in the case of small steering torques around zero is very low. The assistance rises greatly from a steering torque of 0-1 Nm, and has an approximately constant gradient from a steering torque of 3-4 Nm. The characteristic curve for high steering speeds 4 therefore provides a profile, in the case of which the changes of the profile are considerably smaller and are therefore not discernible for the driver. The characteristic curve has a gradient which lies in a range of 0.5 to 1, and changes only slightly over the range of the steering torque. In other words, the maximum change of the gradient is limited.

Figure 3:
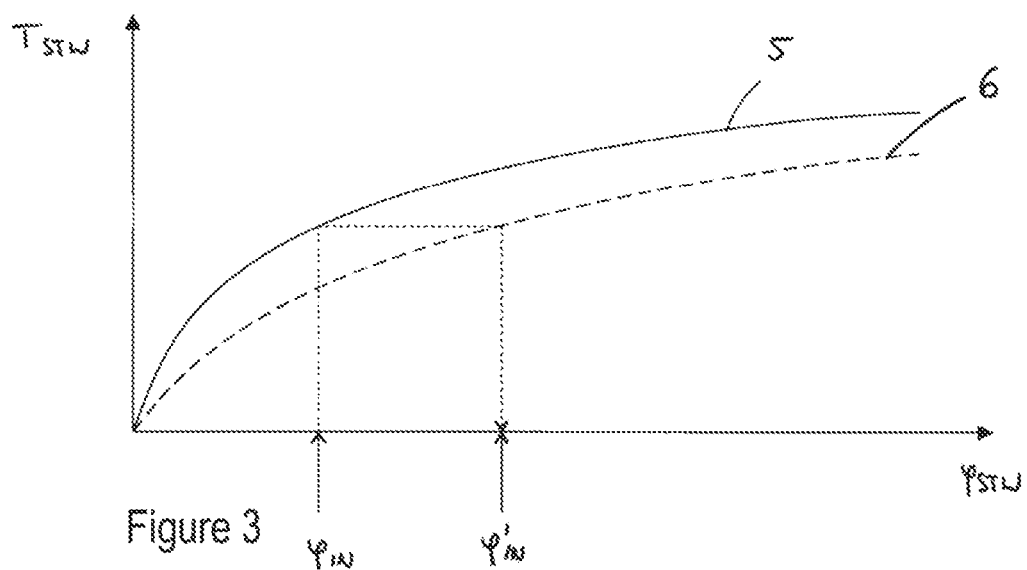
FIG. 3 is a diagrammatic view of a profile of a countertorque that prevails at the steering wheel in a manner that is dependent on a steering angle in a steer-by-wire steering system.

FIG. 3 shows a characteristic curve 5 for a steering feel of a steer-by-wire steering system. In the case of steer-by-wire steering systems, the position of the steered wheels is not coupled directly to the steering wheel. There is a connection between the steering wheel and the steered wheels via electric signals. The driver's steering request is tapped off by a steering angle sensor, and the position of the steered wheels is regulated via a steering actuator in a manner which is dependent on the driver's steering request. A mechanical connection to the wheels is not provided, with the result that, after actuation of the steering wheel, a force feedback is missing, for example a corresponding feedback in the case of parking, where a lower application of force is desired for comfort reasons, or in the case of customary driving straight ahead, in the case of which a higher steering torque which corresponds to the vehicle reaction is desired. In order to simulate the feedback effects of the road on the steering wheel in the case of steer-by-wire steering systems, it is necessary for a feedback actuator (FBA) to be provided at the steering wheel or the steering column, which feedback actuator imparts a steering feel in a manner which is dependent on the feedback effects of the steering handle.

The characteristic curve 5 which is shown shows the base profile of the steering torque $T_{STW}$ which is predetermined by the feedback actuator plotted against the steering wheel rotational angle m, for normal steering speeds (continuous line) and high steering speeds 6 (dashed line). In the case of normal steering speeds and small steering wheel rotational angles, the countertorque rises greatly. The curve flattens in the case of higher steering wheel rotational angles, and merges into an approximately linear curve with a constant gradient.

In an analogous manner with respect to the steering column torque control curve in the case of an electromechanical motor vehicle steering system, the curve flattens for high steering speeds, with the result that the gradient does not exceed a predefined value and is more homogeneous over the entire steering angle range. In other words, the maximum change of the gradient is limited.

The adapted characteristic curve can be obtained by means of the original characteristic curve for low steering speeds by way of rescaling of the X-axis, in particular stretching of the X-axis. It can also be provided that, starting from the characteristic curve for low steering speeds, a characteristic curve for high steering speeds is calculated in accordance with the following equations:

$$\varphi'_{IN} = \varphi_{IN} + b0,$$

where $\varphi_{IN}$ is a steering angle on the characteristic curve for low steering speeds in the case of a predefined countertorque, $\varphi'_{IN}$ is a steering angle on the characteristic curve for high steering speeds in the case of the same predefined countertorque, and b0 is a constant which can arise with the steering speed. It can also be provided that b0 is a function of the steering angle: $b0 = f(\dot\varphi)$. The characteristic curve for high steering speeds can also be calculated in accordance with the following equations:

$$\varphi'_{IN} = \varphi_{IN} + k \cdot \dot\varphi,$$

where $\varphi_{IN}$ is a steering angle on the characteristic curve for low steering speeds in the case of a predefined countertorque, $\varphi'_{IN}$ is a steering angle on the characteristic curve for high steering speeds in the case of the same predefined countertorque, k is a constant, and $\dot\varphi$ is the steering speed.

Here, low steering speeds are steering speeds in a range of 0-50°/sec. In one preferred embodiment, low steering speeds are a steering speed which is equal to zero.

What is claimed is:

1. A method for operating a steering system of a motor vehicle, the method comprising:
    generating a steering feel wherein a characteristic curve represents the steering feel; and
    adapting the characteristic curve based on a steering speed, wherein the characteristic curve is adapted for steering speeds above 150°/s such that an adapted characteristic curve has a smaller maximum change of gradient than the characteristic curve for steering speeds below 150°/s.

2. The method of claim 1 wherein the characteristic curve is adapted for steering speeds above 200°/s.

3. The method of claim 1 wherein the characteristic curve is adapted for steering speeds in a range from 200°/s to 300°/s.

4. The method of claim 1 wherein adapting the characteristic curve comprises resealing an X-axis.

5. The method of claim 1 wherein adapting the characteristic curve comprises resealing an X-axis in a region of a zero crossing of the characteristic curve.

6. The method of claim 1 wherein the characteristic curve and the adapted characteristic curve are base functions.

7. The method of claim 1 wherein the steering system is an electromechanical steering system, wherein the characteristic curve is a base torque curve or a steering column torque control curve.

8. The method of claim 1 wherein the steering system is a steer-by-wire steering system, wherein the characteristic curve represents dependence of a steering force assistance or a countertorque provided by a feedback actuator on a steering angle.

9. The method of claim 8 wherein adapting the characteristic curve comprises adding a constant.

10. The method of claim 9 wherein the constant depends on the steering speed.

11. A steer-by-wire steering system for a motor vehicle, the steer-by-wire steering system comprising:
    a steering actuator that acts on steered wheels, that is regulated electronically based on a driver's steering request, and that acts on the steered wheels by way of a rack and pinion steering gear; and
    a feedback actuator that transmits feedback effects of a road to a steering wheel, the feedback actuator configured to provide a steering torque based on a steering angle by way of a first characteristic curve and a second characteristic curve, wherein the first characteristic curve is provided for higher steering speeds and the second characteristic curve is provided for lower steering speeds, with the first characteristic curve having a smaller maximum change of gradient than the second characteristic curve, wherein the first characteristic curve is calculatable by way of the second characteristic curve, and wherein calculating the second characteristic curve based on the first characteristic curve requires adding a constant.

12. The steer-by-wire steering system of claim 11, wherein the constant depends on steering speed.

13. An electromechanical steering system for a motor vehicle, the electromechanical steering system comprising:
    a steering pinion that is connected to a lower steering shaft and is engaged with a rack that is mounted in a housing such that the rack is displaceable along a longitudinal axis, for steering wheels; and
    an electric motor for steering force assistance, wherein the steering force assistance is defined by a first characteristic curve and a second characteristic curve that are base torque curves or steering column torque control curves, wherein the first characteristic curve is provided for higher steering speeds and the second characteristic curve is provided for lower steering speeds, with the first characteristic curve having a smaller maximum change of gradient than the second characteristic curve, wherein the first characteristic curve is calculatable by way of the second characteristic curve by way of scaling an X-axis.

14. The electromechanical steering system of claim 13, wherein either
    the first and second characteristic curves are base torque curves and the X-axis is stretched, or the first and second characteristic curves are steering column torque control curves and the X-axis is compressed.

* * * * *